(12) United States Patent
Davis

(10) Patent No.: US 6,608,566 B1
(45) Date of Patent: Aug. 19, 2003

(54) REAL-TIME DATA ACQUISITION SYSTEM

(75) Inventor: Larry J. Davis, Provo, UT (US)

(73) Assignee: Larson Davis, Inc, Salt Lake City, UT (US)

( * ) Notice: Subject to any disclaimer, the term of this patent is extended or adjusted under 35 U.S.C. 154(b) by 0 days.

(21) Appl. No.: 09/499,847

(22) Filed: Feb. 7, 2000

(51) Int. Cl.[7] .............................................. G08C 19/10
(52) U.S. Cl. .................................. 340/870.11; 702/35
(58) Field of Search ....................... 340/870.11; 702/54, 702/56, 35; 73/583, 802, 588, 773

(56) References Cited

U.S. PATENT DOCUMENTS

| | | |
|---|---|---|
| 5,195,046 A | 3/1993 | Gerardi et al. |
| 5,592,437 A * | 1/1997 | Elliott .......................... 340/521 |
| 5,774,376 A * | 6/1998 | Manning ...................... 73/583 |
| 5,963,884 A | 10/1999 | Billington et al. |

FOREIGN PATENT DOCUMENTS

WO    WO 97/23765    7/1997

* cited by examiner

Primary Examiner—Timothy Edwards
(74) Attorney, Agent, or Firm—Thorpe North & Western

(57) ABSTRACT

A real-time, or synchronous, sensor data acquisition system acquires physical characteristics or properties associated with a structure or physical system using a plurality of sensors coupled in series to a single cable. The sensors may sense vibration, noise, temperature, acceleration, pressure, strain, force, etc. The sensors transmit data along the cable at greater than 100 dB dynamic range, with a bandwidth between about 5 to 20 KHz, and in a digital, single bit wide data stream. The sensors include modulators to code the data signals with distinct codes. A receiver has a demodulator to decode and separate the data signals.

87 Claims, 5 Drawing Sheets

REAL-TIME DATA ACQUISITION SYSTEM

BACKGROUND OF THE INVENTION

1. The Field of the Invention

The present invention relates generally to a real-time, data acquisition system. More particularly, the present invention relates to a data acquisition system including a plurality of sensors attached to a relatively large, physical structure or object, and daisy-chained to a relatively long, single cable.

2. The Background Art

It is often desirable to measure certain physical characteristics, such as vibration, of large structures, such as bridges or aircraft. Such measurements often require making measurements at a large number of select data points about the structure. Thus, a large number of sensors are often required. For example, referring to FIG. 5, a bridge 514 is shown with a plurality of sensors 518 disposed about the bridge at desired locations. A plurality of cables 522 are used to connect the sensors 518 to a data acquisition system or instrumentation rack 526, so that each sensor 518 supplies data through its own cable 522. Thus, it will be appreciated that a large number of long cables are typically required.

One disadvantage with such a system is the large number of cables and long length of the cabling. Numerous cables are required because of the numerous data points which are typically monitored. The cables must be lengthy because the structures being studied are relatively large or long. It will be appreciated that long cables are expensive, and that the large number of cables multiplies the cost. In addition, the set-up process for a test is long and expensive because of the number of cables which must be disposed about the structure, and the length of the structure over which the cables must be disposed. Furthermore, use of a large number of cables with variable, long lengths can alter or otherwise affect the results of the testing.

It is known to utilize fewer cables, such as in a daisy chain configuration, for other types of data transmission schemes. Such schemes typically utilize frequency division multiple access (FDMA) or time division multiple access (TDMA) techniques. FDMA divides the available spectrum into smaller sections or channels, with a single transmission assigned to each channel. One disadvantage with FDMA is that it is limited by the available spectrum, and the bandwidth requirements for each channel. TDMA divides the available spectrum into time slots, with each transmission assigned to a single time slot. One disadvantage of TDMA is that it does not deal effectively with synchronous sampling or phase coherence of large channels. Another disadvantage with both frequency domain or time domain multiplexing in the analog domain is that it does not provide adequate signal isolation at low cost. In addition, complex filtering, echo resolution, etc. also make it cost prohibitive.

Therefore, it would be advantageous to develop a data acquisition system which would reduce the cost of cabling, set-up, and instrumentation. It would also be advantageous to develop such a system capable of high data bandwidth, high dynamic range, and which is capable of dealing with crosstalk. It would also be advantageous to develop such a system with instrumentation which is inexpensive and simple. It would also be advantageous to develop such a system with low electro-magnetic interference (EMI) emissions and susceptibility.

OBJECTS AND SUMMARY OF THE INVENTION

It is therefore an object of the present invention to provide a real-time, or synchronous, data acquisition system to acquire data from relatively large structures, such as bridges, aircraft, etc.

It is another object of the present invention to provide such a system which reduces the cost of cabling and set-up time for the cabling, while maintaining the number of data points.

It is another object of the present invention to provide such a system which has a high data bandwidth, a high dynamic range, and which reduces crosstalk.

It is yet another object of the present invention to provide such a system with simple and inexpensive instrumentation.

The above objects and others not specifically recited are realized in a specific illustrative embodiment of a real-time, or synchronous, sensor data acquisition system to sense properties or physical characteristics associated with a structure or physical system. The data acquisition system includes a plurality of sensors disposed about the structure and connected in series to a single cable. The sensors may sense vibration, noise, temperature, acceleration, pressure, strain, force, etc. The sensors have sensor circuitry configured to transmit data signals representing the physical characteristics along the cable. A controller or receiver is connected to the cable to receive the data signals from the sensors. A display may be connected to the controller for displaying the properties or physical characteristics associated with the structure or physical system.

The sensors may transmit the data signals at greater than 100 dB dynamic range, with a bandwidth between approximately 5 to 20 KHz, and in a single bit wide data stream.

In accordance with one aspect of the present invention, the sensor and receiver utilize code division multiple access techniques to respectively send and receive the data signals. Thus, the sensors are configured to code the data signals, and the control circuitry is configured to decode the data signals.

Each sensor is configured to produce a sensor signal, and each sensor includes a modulator configured to modulate the sensor signal with a distinct code to produce the data signal. The sensor includes sensor circuitry, such as an analog-to-digital converter to convert the sensor signal to a digital bit stream, and a modulator configured to encode the digital bit stream with an m-sequence modulation. A chip generator may generate one of a plurality of distinct chip codes. The sensors transmit the data signals with distinct delays to match a delay of the furthest sensor.

The controller includes a demodulator to demodulate the data signals. In addition, the controller is configured to correct for delay of the data signals to within 25 nanoseconds. The control includes a delay control counter and clock phase selector which match arrival times of the data signals transmitted from different location distances to one-half a period of a chip clock frequency.

In addition, the controller includes circuitry to correct intersymbol interference by summing the data signals to produce a sum, multiplying the sum by a corrective ratio to produce a correction signal, summing the correction signal to the data signals.

In accordance with another aspect of the present invention, the cable may be over 100 feet long, and includes at least two wire pairs. A first signal and control pair carries data signals from the sensor circuitry and control signals from the controller. A second clock pair carries clock signals from the controller. Power may be provided on either pair, or on a separate third pair.

In accordance with another aspect of the present invention, the single cable is one of a plurality of cables. Each cable is connected to a plurality of sensors, such that each sensor is connected to a cable in series with another sensor.

A method of using the system of the present invention includes locating a plurality of sensors at desired sensor locations on the structure. A cable is located along the desired sensor locations. The sensors are connected in series to the cable. The sensors sense properties or physical characteristics associated with the structure or physical system. The sensors produce data signals representing the physical characteristics, and transmit the data signals along the cable with distinct delays. The data signals are synchronously received by a receiver, and the physical characteristics or properties associated with the structure or physical system are displayed on a display.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION

Figure 1A:
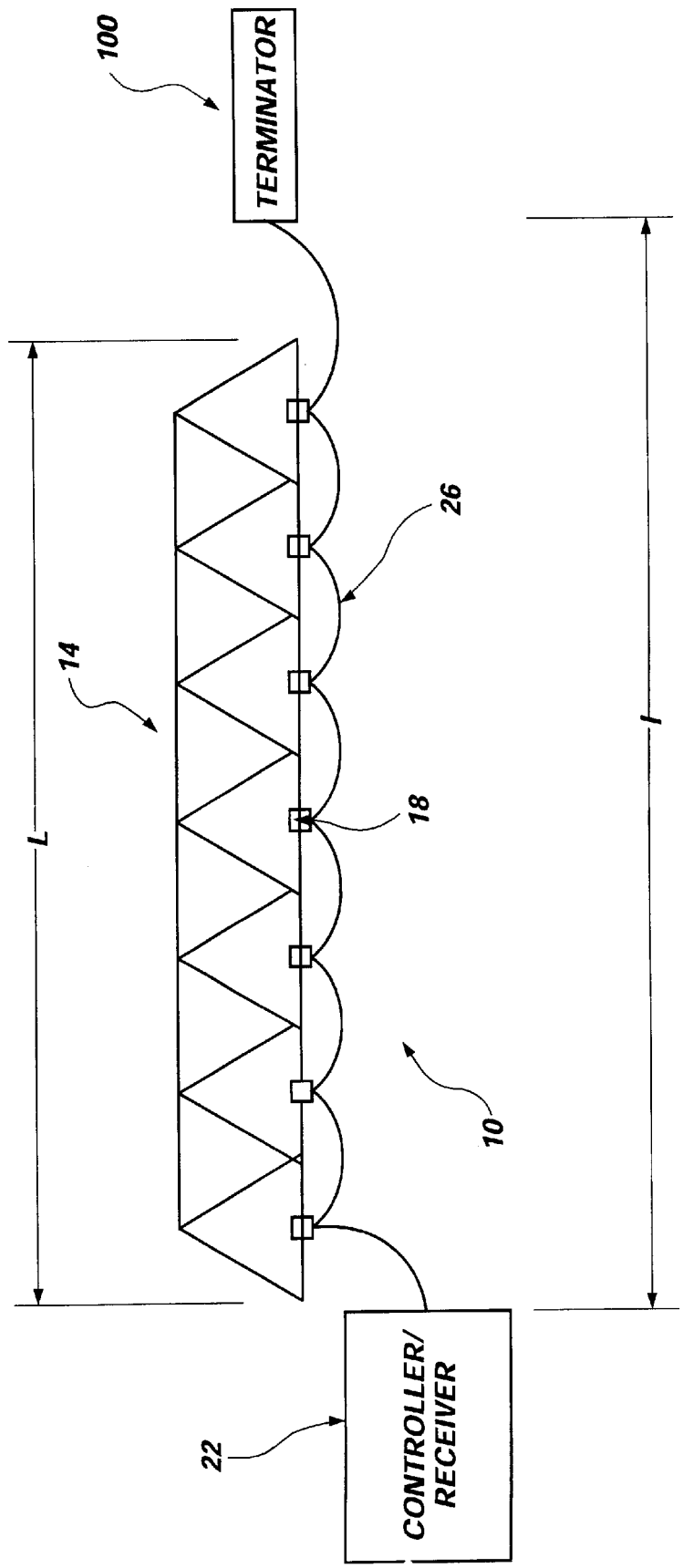
FIGS. 1a and 1b are a schematic views of a preferred embodiment of a data acquisition system in accordance with the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

Figure 1B:
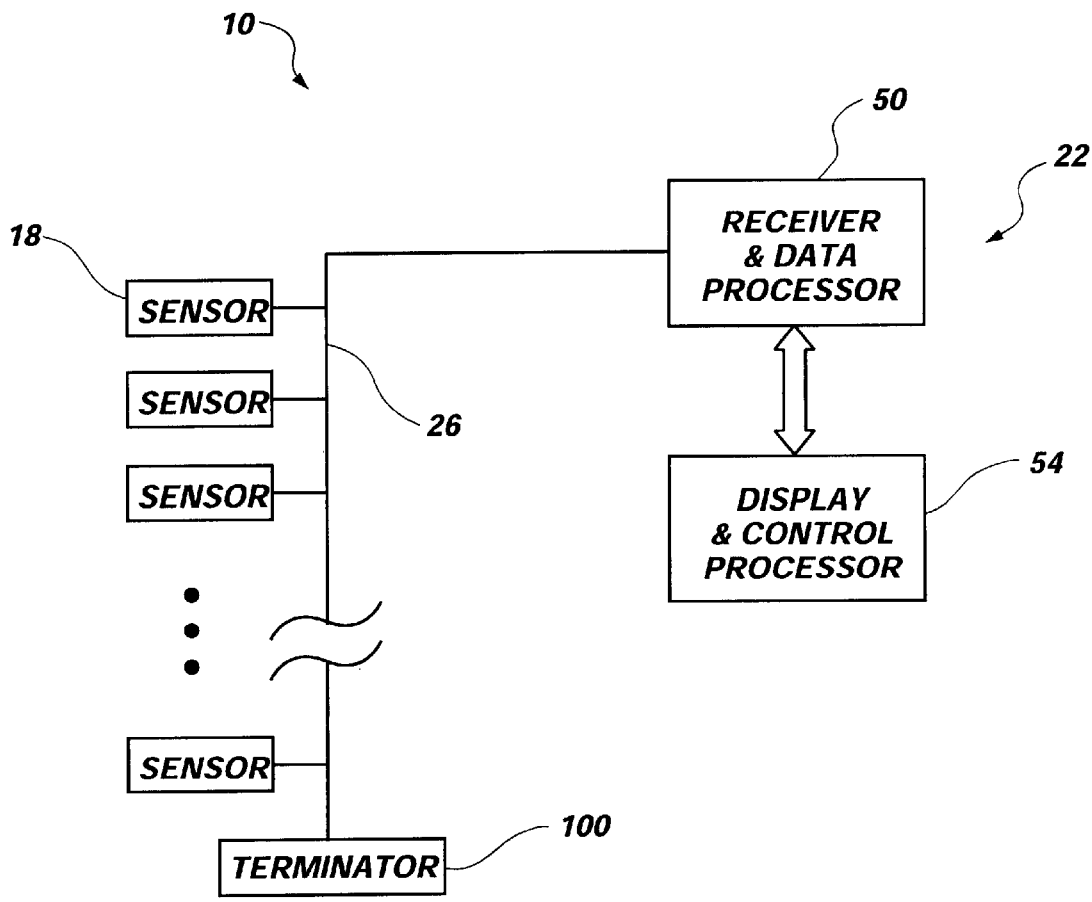

As illustrated in FIGS. 1a and 1b, a real-time, data acquisition system, indicated generally at 10, in accordance with the present invention is shown for acquiring data associated with a physical structure or object, indicated at 14, or other physcial system. The structure 14 may be relatively large, such as, for example, a bridge, an aircraft, a building or auditorium, etc. Thus, the structure may have a length L, circumference, or size of several hundred feet or meters. The data desired to be acquired from the structure includes properties or physical characteristics associated with the structure, such as, for example, vibration, noise or sound, acceleration, temperature, pressure, strain, force, etc. In addition, it may be desirable to acquire such data at numerous points about or along the structure.

The system 10 of the present invention includes a plurality of sensors 18 disposed about the structure 14 and connected to a controller or receiver 22. The plurality of sensors 18 advantageously are coupled to the controller or receiver 24 by a single cable 26, with the sensors 18 coupled in series, or in a daisy-chain configuration. Alternatively, one or more cables may be used with various sets of sensors coupled to a cable, such that each cable includes a plurality of sensors, as discussed more fully below in association with FIG. 4. The use of a single cable 26, or a few cables each having a plurality of sensors, provides a significant advantage because the amount of cabling is reduced, reducing equipment costs for the cable, and reducing set-up time and costs for running the cables.

The cable 26 preferably is a long, inexpensive cable, and thus may have a length 1 of several hundred feet. The cable 26 may have a data bandwidth capacity of 20 to 30 MHz, and an attenuation of about 2 dB/100 feet at 16 MHz. Such an inexpensive cable should be adequate over a distance of approximately 300 feet. It is of course understood that the length and quality of the cable effect the bandwidth capacity and attenuation, and thus more expensive cables may be used for longer distances, greater dynamic ranges, etc. It is desired, however, to reduce the cost of such large scale data acquisition systems, and thus, low cost cabling is preferred. It will also be appreciated that the length and quality of the cable place other limitations on the data transmission methods. For example, high bandwidths and high dynamic ranges are desired due to the length of the cable, but low cost cables have limited bandwidth capacity, thus limiting channel count. As stated above, some typical data transmission schemes, such as frequency domain and time domain multiplexing in the analog domain, are considered to be overly costly and complex, such as requiring complex filtering and echo reduction.

The term "sensor" as used herein refers to an actual sensor element or transducer 30 for sensing a physical characteristic of the structure, as well as more broadly to a sensor device or unit 18, which may include not only the sensor element or transducer 30, but also any associated sensor circuitry 34 disposed in the sensor unit 18.

The sensors 18 or transducers 30 may be any type of sensor or transducer configured to sense the desired physical characteristics associated with the structure 14. Thus, the sensors 18 may include, for example: vibration sensors to sense vibration; acoustic sensors or microphones to sense noise or sound; temperature sensors to sense temperature or temperature changes; accelerometers to sense acceleration or movement in one or more directions; etc. The sensors 18 may be disposed on the structure 14 depending on the type of sensor and desired physical characteristic to be sensed. For example, vibration sensors may be directly and fixedly attached to the structure 14 to sense the vibration of the structure, while acoustic sensors may be disposed on or around the structure 14 to sense noise.

Figure 2:
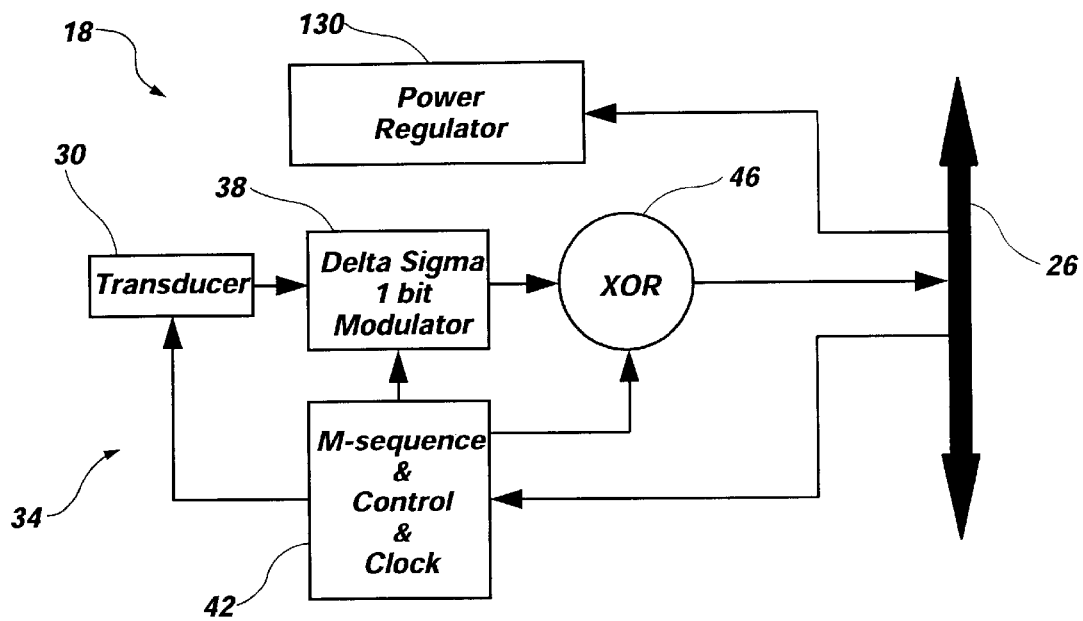
FIG. 2 is a schematic view of a preferred embodiment of a sensor of the data acquisition system of the present invention.

Referring to FIG. 2, the sensors 18 or transducers 30 produce a sensor signal representing the physical characteristic of the structure 14, or converts the physical property to be measured to a conditioned electrical signal. The transducer 30 may include a gain stage or conditioning to modify the sensor signal. Each sensor 18 preferably includes sensor circuitry 34 connected to the transducer 30 and cable 26. The sensor circuitry 34 may perform signal conditioning and/or analog-to-digital conversion functions at each sensor 18. Providing such functions at the sensor 18 advantageously reduces the cost of complex circuitry in the controller or receiver 22.

The sensor circuitry 34 may include an analog-to-digital converter 38 connected to the transducer 30 to convert the sensor signal from the transducer 30 to a digital bit stream signal. The analog-to-digital converter may be a delta-sigma modulator, which provides high dynamic range at a reasonable cost. Such a delta-sigma modulator may provide a bandwidth of 1 Khz at a 120 dB dynamic range with a bit rate of 256 Kbps.

In addition, the analog-to-digital converter 38 preferably converts the sensor signal into a single bit wide digital stream of data to reduce bit errors. Most digital systems convert an analog signal to a multi-bit code, rather than a single-bit. Bit errors are equal disturbances of minimal energy. In a 24 bit analog-to-digital conversion, data is usually serialized into 1, 2 or 4 bit sets before transmission. It will be appreciated that each set is weighted by its position. For example, if a single bit serialization is used, the most significant bit has a value of 0.5, while the least significant bit has a value of 0.0000002. An error in the most significant bit can create a substantial error in signal reconstruction or analysis. By transmitting a single bit, with equally weighted output, of a delta-sigma converter, an arbitrary error of one bit limits its maximum error energy to a value similar to a least significant bit, but never as the most significant bit.

Preferably, the sensors 18 or sensor circuitry 34 are configured to transmit the data signals at greater than approximately 100 dB dynamic range in order to overcome the attenuation of the cable 26 for long distances. In addition, the sensors 18 or sensor circuitry 34 are configured to transmit the data signals at a bandwidth between approximately 5 to 20 Khz, depending on the number of sensors, to provide a sufficient number of channels for the bandwidth capacity of the cable 26. The high dynamic range and high data bandwidth of the signals are desirable to overcome the attenuation of the cable 26 over such long distances. Providing several data signals, each with high dynamic range and data bandwidth, on a single cable 26, however, can pose serious problems, such as crosstalk. In addition, the bandwidth of low cost cables is a limitation. As stated above, frequency domain and time domain multiplexing do not provide adequate signal isolation, and require complex filtering and echo reduction.

Therefore, the sensor circuitry 34 of each sensor 18 preferably encodes the digital bit stream from the analog-to-digital converter 38 with an M-sequence modulation or chip code which is unique to each sensor 18. The M-sequence is a psuedorandom binary sequence of m bits which creates a psuedorandom signature for each sensor 18. Thus, these unique digital codes are used to differentiate the different data signals from the different sensors 18, rather than separate RF frequencies or channels, or separate time slots. Basically, the modulation multiplies the sensor signal or digital bit stream by the M-sequence chip code.

In addition, the data signals are spread over a much greater bandwidth than the original data signals. The greater bandwidth is a noise-like signal with a bandwidth much wider than that of the data signal. Thus, the M-sequence is a digitally generated psuedo-noise signal which is used as a carrier signal for the data signal. The use of pseudo-random noise code is similar to the direct sequence technique of spread spectrum multiplexing techniques, or code division multiple access.

The sensor circuitry 34 also may include a sensor controller or circuitry 42 to provide control signals, clock signals, etc. to the transducer 30 or other sensor circuitry 34.

Preferably, the sensor controllers 42 also provides the M-sequence chip code which is unique to each sensor 18. In addition, the sensor controller 42 may decode commands from the controller or receiver 22. The commands may set the individual sensors chip code, adjust chip code delay and modify the transducers signal processing. The sensor controller 42 may include a chip generator to generate the M-sequence chip code.

The analog-to-digital convertor 38 and sensor controller 42 are connected to an XOR gate 46 to modulate the bit stream from the analog-to-digital convertor 38 with the M-sequence chip code, to produce a data signal for transmission over the cable 26. Thus, the sensor circuitry 34 of each sensor 18 codes the data signal with a distinct code. The M-sequence chip code modulates the sensor signal or bit stream so that the sensor signal or bit stream can be separated from signals of other sensors at the controller or receiver 22. The XOR gate 46 also transmits the data signal to the cable 26 with a high impedance differential drive.

M-sequence chip generators are compact and easily built with inexpensive logic. A reference design that generates 255 bit codes only requires 8 registers, 10 XOR gates, and 9 AND gates. Additional gates may be used to provide synchronization, initialization and sequence selection. Control and addressing can be done using common semiconductors.

As stated above, the controller or receiver 22 is connected to the cable 26 to receive the data signals from the sensors 18, and/or to provide control signals to the sensors 18. The controller or receiver 22 may include a separate receiver 50 to separate the data signals from the sensors 18 for processing, and to make the data available for use, as discussed in greater detail below. In addition, the controller or receiver 22 may include a control processor 54 to provide control of the system 10 and sensors 18, and to provide an analysis interface. The controller 22 or control processor 54 also may include a display or monitor to display the physical characteristics sensed by the sensors 18, and/or the sensor or data signals. A display or monitor is one example of a display means for displaying the physical characteristics or properties. It is of course understood that other display means may be used, including for example, printers, etc. The display and control processor 54 may be integrated, or may be a personal computer.

Figure 3:
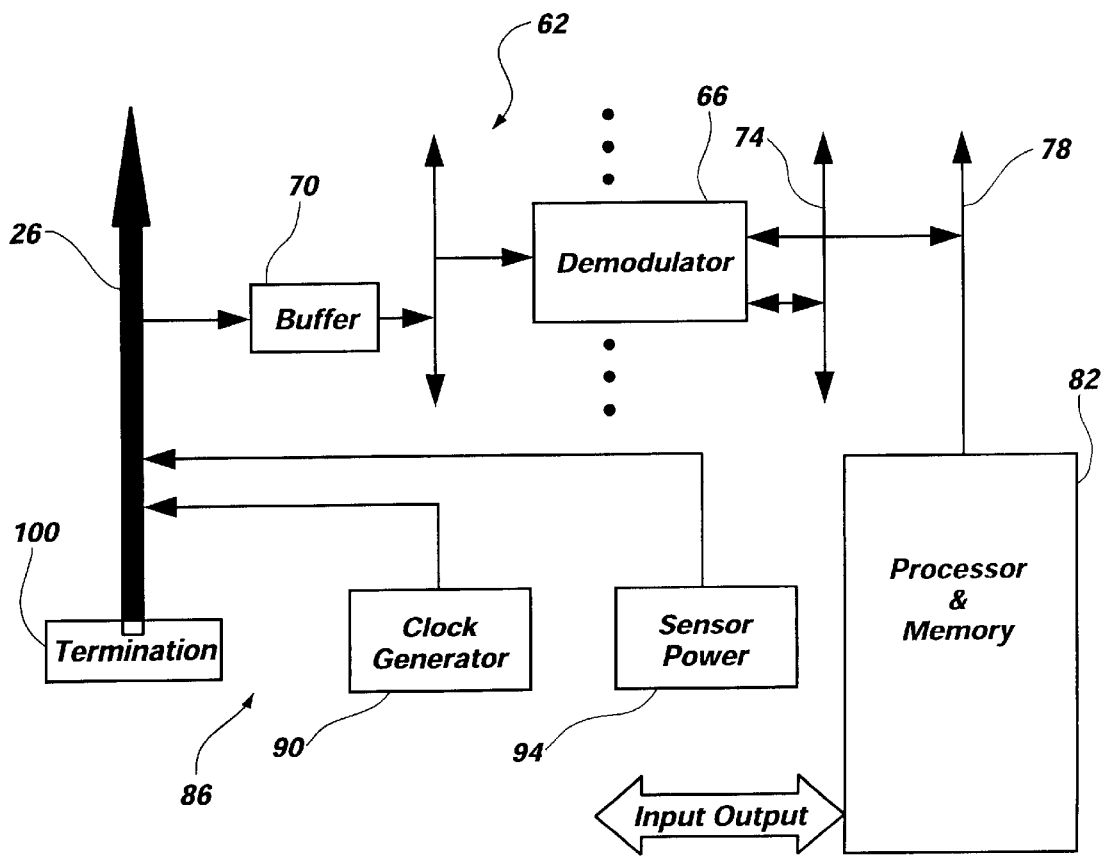
FIG. 3 is a schematic view of a receiver or controller of the data acquisition system of the present invention.

The controller 22 or receiver 50 includes a data or signal processor. Referring to FIG. 3, the controller 22 or receiver 50 includes receiver circuitry 62 to provide signal processing. As stated above, the circuitry 62 separates or decodes the data signals of the sensors 18 from the M-sequence chip codes. The circuitry 62 includes a plurality of demodulators 66, or one for each sensor 18.

The demodulators 66 may be inexpensive and simple because the data signals are synchronized, as discussed more fully below, and because the data signals are only a single bit wide. Each demodulator 66 may multiply the modulated data signal by the same M-sequence chip code, which removes the chip code, to leave the initial data signal. Each demodulator 66 may be a simple synchronous switch that feeds a resetable integrator to a comparator, which converts the signal back to a single bit at the end of a chip sequence.

The system 10 of the present invention is advantageously designed for real-time, or synchronous, sampling to within 25 nanoseconds of the plurality of sensors 18. Synchronous sampling provides for simpler demodulators 66, reduces intersymbol interference, and insures proper signal separation. The plurality of sensors 18 includes sensors located nearer the receiver 50 along the cable 26, and sensors located further from the receiver along the cable 26. Thus, signals further from the controller or receiver 22 will have a time delay.

The sensors 18 or sensor circuitry 34 transmit the data signals with distinct delays to match the delay of the furthest sensor, such that the data signals are received synchronously at the controller or receiver 22. The receiver circuitry 62 may include a buffer 70 to delay capturing the data signals from the sensors 18. The buffer 66 delays capturing the data signals from the sensors 18 to match the delay of the furthest sensor. The receiver circuitry 62 preferably delay corrects the data signals to within 25 nanoseconds. The receiver circuitry 62 may include a delay control counter and clock phase selector which match arrival times of the data signals to one-half a period of a chip clock frequency. Near sensors are programmed with delays that are within 25 nanosecond steps for a chip clock frequency of 20 MHz to match the delay of the farthest sensors. The data signals can then be decoded synchronously at the demodulators 66. The cable delay is known within the same resolution, allowing data signals to be delay corrected to within 25 nanoseconds by an algorithm in the receiver circuitry 62. Therefore, intersymbol interference is reduced by synchronizing chip sequences to arrive synchronously at the demodulator.

The demodulators 66 are connected to a correction sum buss 74 and a control and data buss 78. The receiver circuitry 62 also may perform a correlation integration by XORing a M-sequence with the combined signals of the sensors 18 over the length of the sequence. The sensor with the same M-sequence assignment will decode with a conversion gain N times larger than a sensor with a different assigned code. The signal output of all sensors are summed and factored, and then combined with an individual sensor signal. This creates a correction which removes the effect of non-assigned sensor from the demodulated signal. The demodulated signal is digitized by a comparator to restore the one bit wide data stream. Thus, the demodulation may be a simple synchronous switch that feeds a resetable integrator to the comparator, which converts the signal back to the single bit at the end of a chip sequence. The bit stream may then be processed with a digital low pass filter to reduce bandwidth and remove noise.

When doing a cross correlation of M-sequences the result is one for the same sequence and 1/N to any other sequence where N is the bit length of the sequence. For large N, there is ample discrimination of signals as long as there are not many used. The problem inherent in such a system is to use a similar number of channels as available sequences. This reduces the bandwidth required for the number of channels and keeps the correlators simple. Preferably, 63 sequences are available, of which up to 48 are used. The correction scheme could be used to isolate all 63. The correction scheme removes the 1/N crosstalk. This is important to prevent symbol errors. The worst case example would be using all 63 channels where one channel was only different. This channel would decode a signal of 1−62/63, or 1/63, instead of 1. This has a very poor signal to noise ratio. The 62/63 is the sum of 62 1/N errors summing in the opposite direction to the desired signal. The error sum cancels out the −62/63 error term. Error such as cable reflections could easily swamp out a 1/63 signal. By using the error sum correction, the strength of the signal is improved against error by a factor of 63, or N.

The receiver circuitry 62 includes a processor 82 to perform assignment of chip codes to the demodulators 66, decimation filtering to convert the 1 bit stream to a multi-bit wide stream at a suitable sample rate for further signal processing, recording and input-output.

One advantage of the psuedo-noise signal is that the system's 10 sensitivity to interference is altered. Frequency and time domain systems are designed with a reuse ratio that satisfies the worst-case interference scenario, but only a small fraction of the sensors actually experience the worst case. Because all the sensors 18 utilize the same spectrum, the effective noise is the sum of all other psuedo-noise signals. The controller or receiver 22 may correlate its input with the desired noise carrier, enhancing the signal to noise ratio at the detector. The enhancement overcomes the summed noise enough to provide an adequate signal-to-noise ratio at the detector. Because the interference is summed, the system is no longer sensitive to worst-case interference, but to average interference.

The controller or receiver 22 also may include memory to store the data signals after being processed. The memory may be located in the receiver 50 or receiver circuitry 62, or in the controller 54.

The controller 54 includes control circuitry 82 for controlling the sensors 18 and/or receiver 50. The control circuitry 86 may include a clock generator 90 to generating a clock signal, and a power source 94 to provide power to the sensors 18. The controller 54 may provide set-up and control signals or information to the sensors. Low bandwidth and low cost signaling may be used for the control signals, such as by using Dallas 1-wire protocol. The controller 54 can control or change the chip code, sensor conditioning, sensor identification, specification data, etc. The controller 54 may control the sensor controller 42 to adjust the chip generator or M-sequence to synchronize the chip packets arriving at the demodulator.

Preferably, the cable 26 includes at least three pairs. A first pair, or signal pair, carries data signals from the sensors 18 or sensor circuitry 34, and may carry control signals from the controller 22. A second pair, or clock pair, carries clock signals from the controller 22, or control circuitry 86. Finally, a third pair, or power pair, provides power to the sensors 18. Thus, the clock and data signals are carried by separate wires to reduce the cost and complexity of clock extraction circuitry. Alternatively, two pair may be used, such as the first signal pair, and the second clock pair, with either pair providing power.

The cable 26 is terminated at its distal end by a terminator 100 to prevent signal reflection.

The sensors 18 may be connected to the cable 26 by appropriate taps. The taps are high impedance relative to the cable 26.

Figure 4:
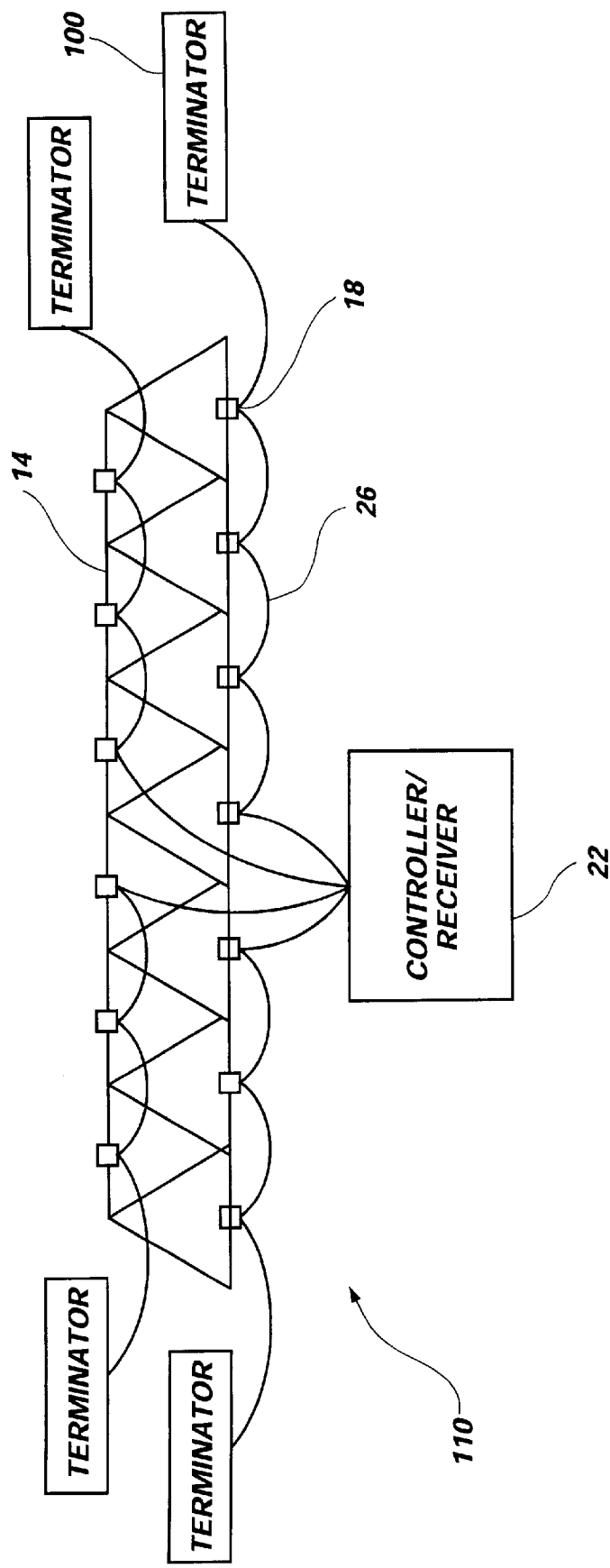
FIG. 4 is a schematic views of an alternative embodiment of a data acquisition system in accordance with the present invention.
Figure 5:
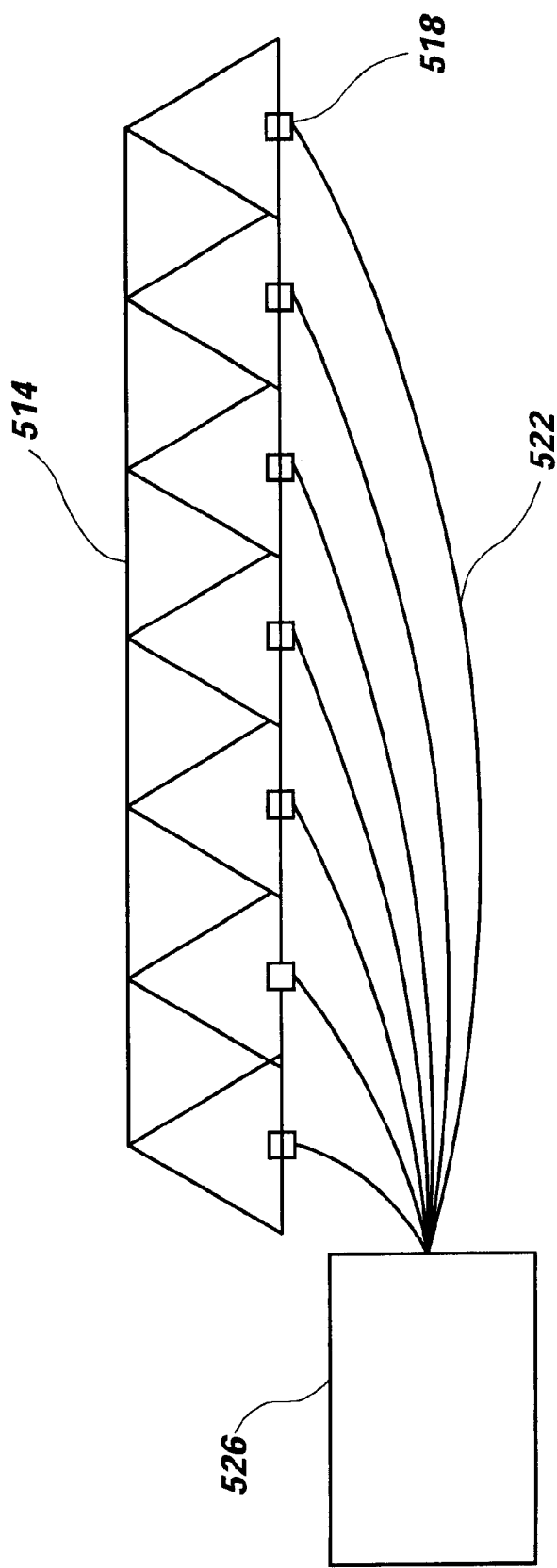
FIG. 5 is a schematic view of a prior art system.

Referring to FIG. 4, an alternative embodiment of a data acquisition system 110 of the present invention is shown. The system 110 includes a plurality of cables 26, each having a plurality of sensors 18 connected thereto. Each of the plurality of cables 26 is connected to the controller and/or receiver 22 at its proximal end, and a terminator 100 at its distal end. It will be appreciated that some structures or test scenarios may be better served by two or more cables 26, rather than a single cable, while maintaining the benefit of connecting a plurality of sensors 18 to each cable 26 so that the number of cables 26 is significantly less than the number of sensors 18.

Preferably, the controller or receiver 22 and cables 26 are configured to create chains or cables 26, each with groups of eight channels or sensors 18. The receiver 22 may be designed to detect the number of sensors 18 connected to each cable 26, and attach a group of demodulators to the cable 26. The controller or receiver 22 preferably is configured to support up to 64 sensors 18. The sensors 18 and cables 26 may be configured as desired, including for example:

8 cables, each with 8 sensors;

6 cables with 8 sensors and 1 cable with 16 sensors;

2 cables with 24 sensors and 2 cables with 8 sensors; or 1 cable with 48 sensors and 1 cable with 16 sensors; etc.

Thus, the system 110 allows for flexibility in positioning sensors 18 and cables 26.

As stated above, the data signal bandwidth preferably is between about 5 to 20 KHz, depending on the number of sensors 18. The bandwidth may be 5 Khz for 48 sensors on a cable, or 20 Khz with 16 sensors on a cable. The clock frequency may be 21 MHz. The delta-sigma analog-to-digital convertor has a bit rate of 348 KHz with a 5 KHz bandwidth, which is filtered and decimated to 12800 Hz sample rate.

The sensors 18 may be located on the structure 14 in different location, or the sensors 18 may be located in a common location. In addition, some of the sensors 18 may be configured to sense other, different physical characteristics. For example, some sensors 18 may sense vibration while others sense noise.

A method of using the above described systems includes locating the sensors 18 at desired sensor locations on or about the structure 14. One or more cables 26 are located along the desired sensor locations and sensors 18, such that a plurality of sensors 18 may be connected to each cable. The sensors 18 are connected to the cable 26. The sensors 18 are operated to sense a physical characteristic of the structure 14 and produce a data signal associated with the physical characteristic. The sensors 18 transmit the data signals along the cable. The signals are received by the controller and/or receiver 22 where they are processed and displayed.

Referring again to FIG. 2, the sensors 18 may include a power regulator 130, connected to the cable 26 and the transducer 30 and/or sensor circuitry 34, to provide and regulate power in the sensor 18.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiments(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A real-time, sensor data acquisition system configured to acquire data from a physical system, comprising:

a plurality of sensors, configured to be located on the structure and electrically coupled in series to a single cable, and configured to sense properties associated with the physical system and transmit data signals representing the properties along the cable; and a controller, electrically coupled to the cable, configured to receive the data signals; and the controller including a delay control counter and clock phase selector which match arrival times of the data signals transmitted from different location distances to one-half a period of a chip clock frequency.

2. The system of claim 1, wherein the sensors are selected from the group consisting of: vibration sensors, acoustic sensors, temperature sensors, pressure sensors, strain sensors, force sensors, and accelerometers.

3. The system of claim 1, wherein the cable is over 100 feet long.

4. The system of claim 1, wherein the sensors are configured to transmit the data signals at greater than 100 dB dynamic range.

5. The system of claim 1, wherein the sensors are configured to transmit the data signals at a bandwidth between approximately 5 to 20 KHz.

6. The system of claim 1, wherein the cable includes at least two wire pairs, including:

a first signal pair configured to carry data signals from the sensor circuitry; and a second clock pair configured to carry clock signals; and wherein either pair is configured to provided power.

7. The system of claim 1, wherein the cable includes at least three wire pairs, including:

a first signal pair configured to carry data signals from the sensor circuitry;

a second clock pair configured to carry clock signals; and a third power pair configured to provide power to the sensor circuitry.

8. The system of claim 1, further comprising display means, electrically coupled to the controller, configured for displaying the physical characteristics associated with the structure.

9. The system of claim 1, wherein the plurality of sensors includes nearer sensors located nearer the controller along the cable and a furthest sensor located furthest from the controller along the cable; and wherein the nearer sensors have delays in transmission of signals to match a delay in transmission of a signal from the furthest sensor, such that all the signals are received synchronously at the controller.

10. The system of claim 1, wherein the control includes circuitry configured to correct for delay of the data signals to within 25 nanoseconds.

11. The system of claim 1, wherein the sensors are configured to code the data signals, and the controller is configured to decode the data signals.

12. The system of claim 1, wherein the sensors and controller utilize code division multiple access techniques to respectively send and receive the data signals.

13. The system of claim 1, wherein each sensor is configured to produce a sensor signal, and includes a modulator configured to modulate the sensor signal with a distinct code to produce the data signal; and wherein the controller includes a demodulator to demodulate the data signals.

14. The system of claim 1, wherein the controller includes circuitry to correct intersymbol interference by summing the data signals to produce a sum, multiplying the sum by a corrective ratio to produce a correction signal, summing the correction signal to the data signals.

15. The system of claim 1, wherein the sensor is configured to produce a sensor signal, and the sensor includes:

an analog-to-digital converter configured to convert the sensor signal to a digital bit stream; and a modulator configured to encode the digital bit stream with an m-sequence modulation.

16. The system of claim 1, wherein the sensor is configured to produce a single bit wide data stream.

17. The system of claim 1, wherein each sensor includes a chip generator configured to generate one of a plurality of distinct chip codes; and wherein the plurality of sensors connected to the cable is less than or equal to a number of distinct chip codes.

18. The system of claim 1, wherein each sensor includes a chip generator configured to generate one of 63 distinct chip codes; and wherein the plurality of sensors connected to the cable is 48 or less.

19. The system of claim 1, wherein the single cable is one of a plurality of cables, each of the plurality of cables being connected to a plurality of sensors, such that each sensor is connected to a cable in series with another sensor.

20. The system of claim 1, wherein the sensors are located at separate locations.

21. The system of claim 1, wherein the sensors are located at a common location.

22. The system of claim 1, wherein some of the sensors are configured to sense a different properties of the physical system.

23. A real-time, sensor data acquisition system configured to sense data from a structure, comprising:
  a cable;
  a plurality of sensors, configured to be located on the structure and electrically connected in series to the cable, and configured to sense physical characteristics associated with the structure and having sensor circuitry configured to transmit data signals representing the physical characteristics along the cable;
  a controller, electrically coupled to the cable, and having controller circuitry configured to receive the data signals;
  the controller including circuitry to correct intersymbol interference by summing the data signals to produce a sum, multiplying the sum by a corrective ratio to produce a correction signal, summing the correction signal to the data signals.

24. The system of claim 23, wherein the sensors are selected from the group consisting of: vibration sensors, acoustic sensors, temperature sensors, pressure sensors, strain sensors, force sensors, and accelerometers.

25. The system of claim 23, further comprising display means, coupled to the controller, configured for displaying the physical characteristics associated with the structure.

26. The system of claim 23, wherein the cable is over 100 feet long.

27. The system of claim 23, wherein the sensor circuitry is configured to transmit the data signals at greater than 100 dB dynamic range.

28. The system of claim 23, wherein the sensors are configured to transmit the data signals at a bandwidth between approximately 5 to 20 KHz.

29. The system of claim 23, wherein the cable includes at least two wire pairs, including:
  a first signal and control pair configured to carry data signals from the sensor circuitry and to carry control signals from the controller; and
  a second clock pair configured to carry clock signals from the controller; and
  wherein either pair is configured to provided power.

30. The system of claim 23, wherein the cable includes at least three wire pairs, including:
  a first signal and control pair configured to carry data signals from the sensor circuitry and to carry control signals from the controller;
  a second clock pair configured to carry control signals from the controller; and
  a third power pair configured to provide power to the sensor circuitry.

31. The system of claim 23, wherein the plurality of sensors includes nearer sensors located nearer the controller along the cable and a furthest sensor located furthest from the controller along the cable; and wherein the nearer sensors have delays in transmission of signals to match a delay in transmission of a signal from the furthest sensor, such that all the signals are received synchronously at the controller.

32. The system of claim 23, wherein the control circuitry includes circuitry configured to correct for delay of the data signals to within 25 nanoseconds.

33. The system of claim 23, wherein the control circuitry includes a delay control counter and clock phase selector which match arrival times of the data signals transmitted from different locations distances to one-half a period of a chip clock frequency.

34. The system of claim 23, wherein the sensor circuitry is configured to produce a single bit wide data stream.

35. The system of claim 23, wherein the sensor circuitry is configured to code the data signals, and the control circuitry is configured to decode the data signals.

36. The system of claim 23, wherein the sensor circuitry and controller circuitry utilize code division multiple access techniques to respectively send and receive the data signals.

37. The system of claim 23, wherein each sensor is configured to produce a sensor signal, and the sensor circuitry of each sensor includes a modulator configured to modulate the sensor signal with a distinct code to produce the data signal; and wherein the control circuitry includes a demodulator to demodulate the data signals.

38. The system of claim 23, wherein the sensor is configured to produce a sensor signal, and the sensor circuitry includes:
  an analog-to-digital converter configured to convert the sensor signal to a digital bit stream; and
  a modulator configured to encode the digital bit stream with an m-sequence modulation.

39. The system of claim 23, wherein the sensor circuitry of each sensor includes a chip generator configured to generate one of a plurality of distinct chip codes; and wherein the plurality of sensors connected to the cable is less than or equal to a number of distinct chip codes.

40. The system of claim 23, wherein the sensor circuitry of each sensor includes a chip generator configured to generate one of 63 distinct chip codes; and wherein the plurality of sensors connected to the cable is 48 or less.

41. The system of claim 23, wherein the single cable is one of a plurality of cables, each of the plurality of cables being connected to a plurality of sensors, such that each sensor is connected to a cable in series with another sensor.

42. The system of claim 23, wherein the sensors are located at separate locations.

43. The system of claim 23, wherein the sensors are locates at a common location.

44. The system of claim 23, wherein some of the sensors are configured to sense a different physical property.

45. A real-time, sensor data acquisition system configured to sense vibration of a structure, comprising:
  a cable;
  a plurality of vibration sensors, configured to be located on the structure and electrically connected in series to the cable, and configured to sense vibration of the structure and having sensor circuitry configured to transmit data signals representing the vibration along the cable;

a controller, electrically coupled to the cable, and having controller circuitry configured to receive the data signals;

the control circuitry including a delay control counter and clock phase selector which match arrival times of the data signals transmitted from different location distances to one-half a period of a chip clock frequency.

46. The system of claim 45, further comprising display means, coupled to the controller, configured for displaying the vibration associated with the structure.

47. The system of claim 45, wherein the cable is over 100 feet long.

48. The system of claim 45, wherein the sensor circuitry is configured to transmit the data signals at greater than 100 dB dynamic range.

49. The system of claim 45, wherein the sensors are configured to transmit the data signals at a bandwidth between approximately 5 to 20 KHz.

50. The system of claim 45, wherein the cable includes at least two wire pairs, including:
   a first signal and control pair configured to carry data signals from the sensor circuitry and to carry control signals from the controller; and
   a second clock pair configured to carry clock signals from the controller; and
wherein either pair is configured to provided power.

51. The system of claim 45, wherein the cable includes at least three wire pairs, including:
   a first signal and control pair configured to carry data signals from the sensor circuitry and to carry control signals from the controller;
   a second clock pair configured to carry control signals from the controller; and
   a third power pair configured to provide power to the sensor circuitry.

52. The system of claim 45, wherein the plurality of sensors includes nearer sensors located nearer the controller along the cable and a furthest sensor located furthest from the controller along the cable; and wherein the nearer sensors have delays in transmission of signals to match a delay in transmission of a signal from the furthest sensor, such that all the signals are received synchronously at the controller.

53. The system of claim 45, wherein the control circuitry includes circuitry configured to correct for delay of the data signals to within 25 nanoseconds.

54. The system of claim 45, wherein the sensor circuitry is configured to produce a single bit wide data stream.

55. The system of claim 45, wherein the sensor circuitry is configured to code the data signals, and the control circuitry is configured to decode the data signals.

56. The system of claim 45, wherein the sensor circuitry and controller circuitry utilize code division multiple access techniques to respectively send and receive the data signals.

57. The system of claim 45, wherein each sensor is configured to produce a sensor signal, and the sensor circuitry of each sensor includes a modulator configured to modulate the sensor signal with a distinct code to produce the data signal; and wherein the control circuitry includes a demodulator to demodulate the data signals.

58. The system of claim 45, wherein the sensor is configured to produce a sensor signal, and the sensor circuitry includes:
   an analog-to-digital converter configured to convert the sensor signal to a digital bit stream; and
   a modulator configured to encode the digital bit stream with an m-sequence modulation.

59. The system of claim 45, wherein the sensor circuitry of each sensor includes a chip generator configured to generate one of a plurality of distinct chip codes; and wherein the plurality of sensors connected to the cable is less than or equal to a number of distinct chip codes.

60. The system of claim 45, wherein the sensor circuitry of each sensor includes a chip generator configured to generate one of 63 distinct chip codes; and wherein the plurality of sensors connected to the cable is 48 or less.

61. The system of claim 45, wherein the controller includes circuitry to correct intersymbol interference by summing the data signals to produce a sum, multiplying the sum by a corrective ratio to produce a correction signal, summing the correction signal to the data signals.

62. The system of claim 45, wherein the single cable is one of a plurality of cables, each of the plurality of cables being connected to a plurality of sensors, such that each sensor is connected to a cable in series with another sensor.

63. The system of claim 45, wherein the sensors are located in different locations.

64. The system of claim 45, wherein the sensors are located in a common location.

65. The system of claim 45, further comprising other sensors configured to sense a different physical characteristic other than vibration.

66. A method for real-time, sensor data acquisition, the method comprising the steps of:
   a) locating a plurality of sensors at desired sensor locations;
   b) locating a single cable along the desired sensor locations;
   c) electrically connecting the plurality of sensors in series to the single cable;
   d) sensing properties of a physical system with the sensors;
   e) producing data signals representing the properties;
   f) transmitting the data signals with distinct delays along the single cable;
   g) receiving the data signals synchronously at a controller; and
   h) matching arrival times of the data signals to one-half a period of a chip clock frequency using a delay control counter and clock phase selector.

67. The method of claim 66, wherein locating the plurality of sensors at the desired sensor locations includes locating the sensors on a structure.

68. The method of claim 66, wherein the sensors are selected from the group consisting of: vibration sensors, acoustic sensors, temperature sensors, pressure sensors, strain sensors, force sensors, and accelerometers.

69. The method of claim 66, further comprising displaying the properties associated with the physical system.

70. The method of claim 66, wherein the cable is over 100 feet long.

71. The method of claim 66, wherein transmitting the data signals includes transmitting the data signals at greater than 100 dB dynamic range.

72. The method of claim 66, wherein transmitting the data signals includes transmitting the data signals at a bandwidth between approximately 5 to 20 KHz.

73. The method of claim 66, wherein the cable includes at least two wire pairs, including:
   a first signal and control pair configured to carry data signals from the sensor circuitry and to carry control signals from the controller; and
   a second clock pair configured to carry clock signals from the controller; and
wherein either pair is configured to provided power.

74. The method of claim 66, wherein the cable includes at least three wire pairs, including:
- a first signal and control pair configured to carry data signals from the sensor circuitry and to carry control signals from the controller;
- a second clock pair configured to carry control signals from the controller; and
- a third power pair configured to provide power to the sensor circuitry.

75. The method of claim 66, wherein the plurality of sensors includes nearer sensors located nearer the controller along the cable and a furthest sensor located furthest from the controller along the cable; and further comprising delaying capture of the data signals to match a delay of the furthest sensor.

76. The method of claim 66, further comprising delay correcting the data signals to within 25 nanoseconds.

77. The method of claim 66, wherein producing data signals includes producing data signals with in a single bit wide data stream.

78. The method of claim 66, wherein producing the data signals includes coding the data signals; and further comprising decoding the data signals.

79. The method of claim 66, wherein producing data signals includes producing sensor signals, and modulating the sensor signals with distinct codes to produce the data signals; and further comprising demodulating the data signals.

80. The method of claim 66, wherein the sensor includes:
- an analog-to-digital converter configured to convert the sensor signal to a digital bit stream; and
- a modulator configured to encode the digital bit stream with an m-sequence modulation.

81. The method of claim 66, wherein the sensor circuitry of each sensor includes a chip generator configured to generate one of a plurality of distinct chip codes; and wherein the plurality of sensors connected to the cable is less than or equal to a number of distinct chip codes.

82. The method of claim 66, wherein the sensor circuitry of each sensor includes a chip generator configured to generate one of 63 distinct chip codes; and wherein the plurality of sensors connected to the cable is 48 or less.

83. The method of claim 66, further comprising correcting intersymbol interference by summing the data signals to produce a sum, multiplying the sum by a corrective ratio to produce a correction signal, summing the correction signal to the data signals.

84. The method of claim 66, wherein locating the single cable includes locating a plurality of cables; and wherein connecting the plurality of sensors includes connecting each sensor to one of the plurality of cables, such that each sensor is connected to a cable in series with another sensor.

85. The method of claim 66, wherein locating the sensors includes locating the sensors in different locations.

86. The method of claim 66, wherein locating the sensors includes locating the sensors in a common location.

87. The method of claim wherein some of the sensors are configured to sense a different properties of the physical system.

* * * * *